(12) United States Patent
Hecht et al.

(10) Patent No.: US 7,775,751 B2
(45) Date of Patent: Aug. 17, 2010

(54) ROTARY CUTTING TOOL

(75) Inventors: Gil Hecht, Nahariya (IL); Oleg Eliezer, Nahariya (IL); Tsur Cohen, Kfar Vradim (IL)

(73) Assignee: Iscar, Ltd., Tefen (IL)

( * ) Notice: Subject to any disclaimer, the term of this patent is extended or adjusted under 35 U.S.C. 154(b) by 985 days.

(21) Appl. No.: 11/539,499

(22) Filed: Oct. 6, 2006

(65) Prior Publication Data

US 2007/0104549 A1    May 10, 2007

(30) Foreign Application Priority Data

Nov. 6, 2005    (IL)    .................................... 171791

(51) Int. Cl.
*B23B 51/06* (2006.01)
(52) U.S. Cl. .............. 408/57; 408/233; 279/8
(58) Field of Classification Search ............. 408/56, 408/57, 59, 231–233, 238, 239 R, 239 A; 409/232, 234; 279/8, 99–101, 20
See application file for complete search history.

(56) References Cited

U.S. PATENT DOCUMENTS

| | | | | |
|---|---|---|---|---|
| 2,867,140 A | * | 1/1959 | Getts ........................... | 408/57 |
| 2,977,859 A | * | 4/1961 | Glaser .......................... | 407/48 |
| 4,921,376 A | * | 5/1990 | Tani et al. .................... | 409/131 |
| 6,109,152 A | * | 8/2000 | Hecht ........................... | 82/160 |
| 6,595,727 B2 | * | 7/2003 | Arvidsson ..................... | 407/35 |
| 6,896,450 B2 | * | 5/2005 | Rothenstein .................. | 408/59 |
| 7,125,207 B2 | * | 10/2006 | Craig et al. .................. | 409/136 |
| 7,537,422 B2 | * | 5/2009 | Ballas et al. ................ | 409/136 |
| 2004/0022594 A1 | | 2/2004 | Hecht | |

FOREIGN PATENT DOCUMENTS

| | | | |
|---|---|---|---|
| DE | 10227687 A1 * | 1/2004 | |
| EP | 1090705 A2 * | 4/2001 | |
| JP | 2004237401 A * | 8/2004 | |
| JP | 2004276136 A * | 10/2004 | |
| JP | 2004338000 A * | 12/2004 | |
| WO | WO 9206817 A2 * | 4/1992 | |
| WO | WO 2007/003248 A1 | 1/2007 | |

OTHER PUBLICATIONS

International Search Report, PCT/IL2006/001199, dated May 23, 2007.

* cited by examiner

*Primary Examiner*—Daniel W Howell
(74) *Attorney, Agent, or Firm*—Womble Carlyle (57) ABSTRACT

A rotary cutting tool comprises a cutting head which is axially secured to a forward end of a shank by a locking screw. At least one radially extending locking wing of the locking screw is located in at least one radial recess of the cutting head or at least one radially extending passage is formed between the locking screw and the cutting head.

17 Claims, 6 Drawing Sheets

ROTARY CUTTING TOOL

FIELD OF THE INVENTION

The present invention relates to a rotary cutting tool having a cutting head which is axially secured thereon by a screw.

BACKGROUND OF THE INVENTION

In such rotary cutting tools, forces acting on the cutting head during a cutting operation may release the screw from its threading engagement in the cutting tool and thereby reduce the axial securement of the cutting head thereon.

In addition, if such rotary cutting tools are provided with an internal axial channel for coolant fluid, the channel will typically extend through the screw. In the case of a small diameter cutting tool having a small diameter screw, the channel passing through the screw may weaken the screw to such an extent that it will not withstand the forces acting thereon during a cutting operation.

It is an object of the present invention to provide a rotary cutting tool that significantly reduces or overcomes the aforementioned disadvantages.

The objects of the invention are attained with the subject matter in accordance with the respective claims.

SUMMARY OF THE INVENTION

In accordance with the present invention there is provided a rotary cutting tool having a longitudinal axis of rotation and comprising a shank, a cutting head and a locking screw;

the shank comprises an axially extending shank channel, the cutting head is located at an axial forward end of the shank and comprises a head face at a forward end thereof and an axially extending head channel, at least one radial recess is formed in the head face, the locking screw extends axially through the head channel, is retained in the shank channel and comprises at least one locking wing transverse to the axis of rotation, the at least one locking wing being located in an associated radial recess.

In accordance with the present invention there is also provided a rotary cutting tool having a longitudinal axis of rotation and comprising a shank, a cutting head and a locking screw;

the shank comprises an axially extending shank channel, the cutting head is located at an axial forward end of the shank and comprises an axially extending head channel, the locking screw extends axially through the head channel and is retained in the shank channel, at least one passage is formed between the locking screw and the cutting head.

Preferably, the at least one passage extends radially.

Typically, the cutting head comprises a head face and at least one radial recess, the at least one radial recess is formed in the cutting head and opens out to the head face and the at least one passage is formed between the cutting head and the at least one radial recess.

Typically, the cutting head comprises a plurality of cutting edges on a peripheral head surface thereof, the at least one radial recess communicates with the head channel and opens out to the peripheral head surface adjacent a given cutting edge.

Preferably, the locking screw comprises an axially extending locking rod having at least a portion which is threaded, at least a portion of the shank channel comprises an internal shank thread and the cutting tool comprises a bushing threadingly engaged in the internal shank thread with the locking rod threadingly engaged in the bushing.

If desired, the bushing has a major bushing channel opening out to a rear end thereof and at least one minor bushing channel diverging forwardly and opening out to a peripheral bushing surface thereof.

If desired, the rotary cutting tool is a reamer.

DETAILED DESCRIPTION OF THE INVENTION

Figure 1:
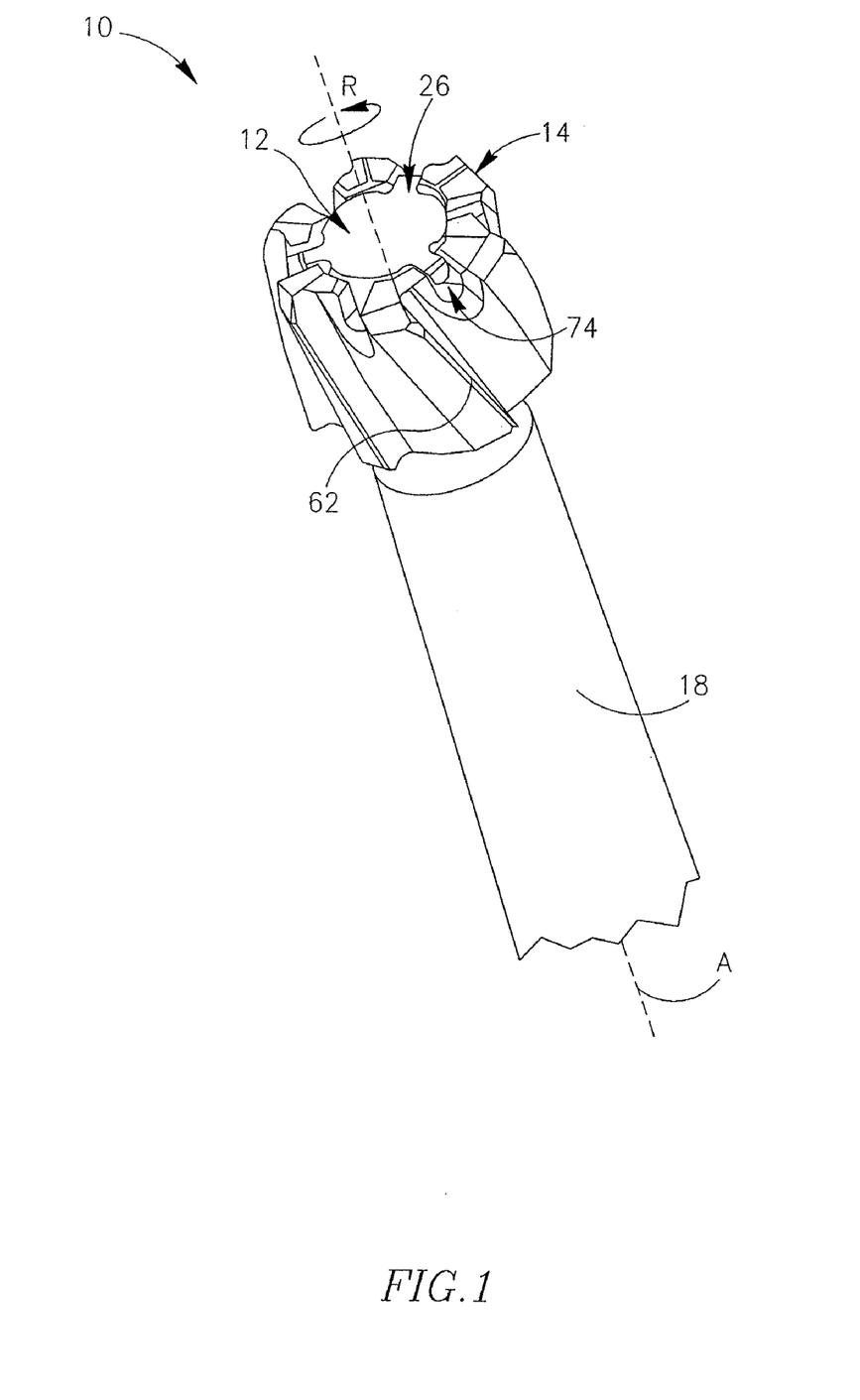
FIG. 1 is a perspective view of a reamer in accordance with the present invention.
Figure 2:
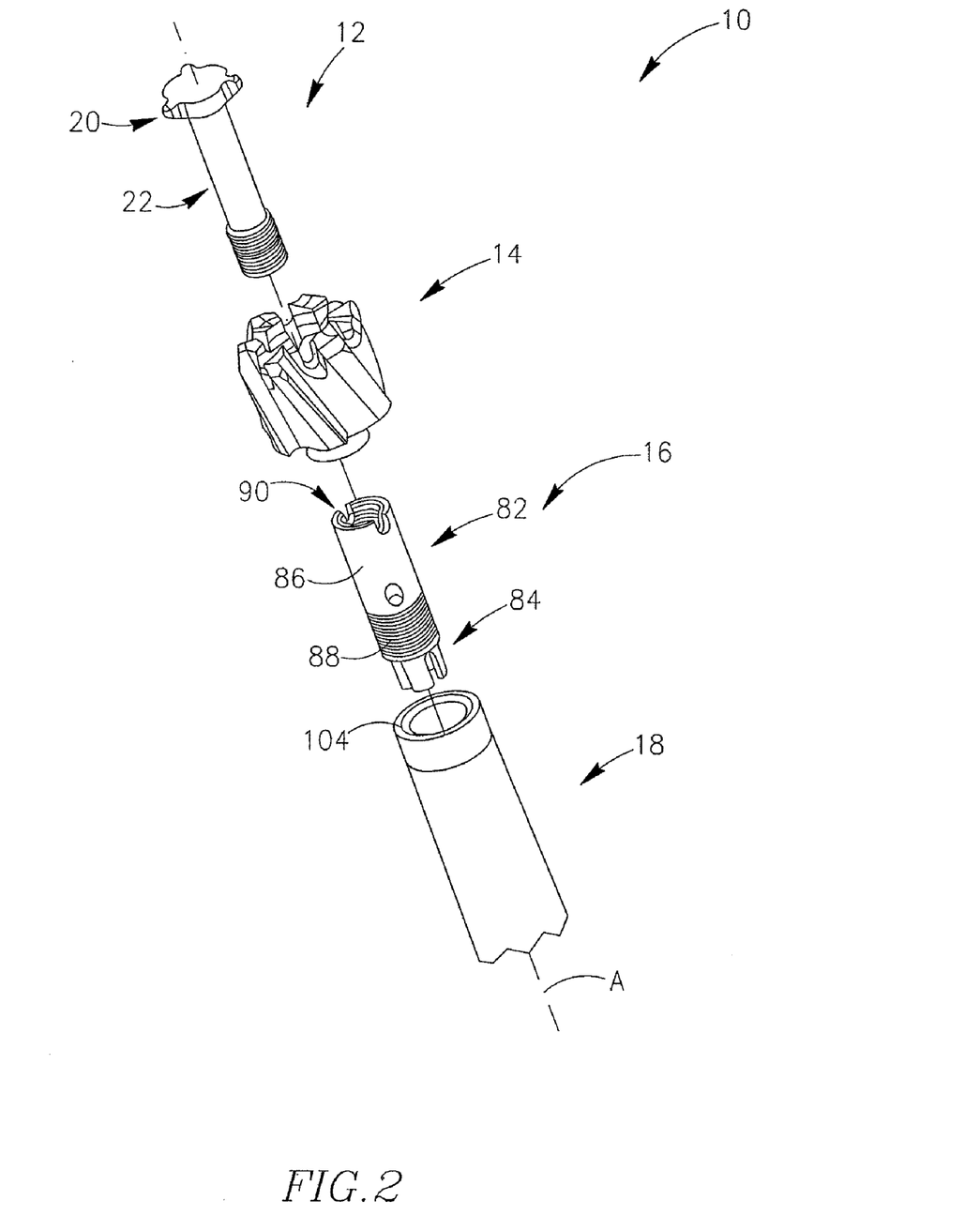
FIG. 2 is an exploded perspective view of the reamer.

Attention is drawn to FIGS. 1 and 2 showing a reamer 10 having a longitudinal axis of rotation A defining a direction of rotation R. The reamer 10 has a locking screw 12, a cutting head 14, a bushing 16 and a shank 18. These parts are all located about the axis of rotation A when the reamer 10 is assembled. The cutting head 14 preferably is a form pressed and sintered hard metal body made from a carbide powder such as Tungsten Carbide. The locking screw 12 and the shank 18 are formed of machined steel or other hard materials. The present invention will be described herein with reference to the reamer 10 however it will be clear to the skilled person in the art that it may be applied to a variety of rotary cutting tools where releasable mounting of the cutting head 14 is required. In addition, each part of the reamer 10 will be described herein in its respective orientation in the assembled reamer 10 and in relation to the axis of rotation A. It should be noted that directional terms appearing throughout the specification and claims, e.g. "forward", "rear", etc., (and derivatives thereof) are for illustrative purposes only, and are not intended to limit the scope of the appended claims.

The locking screw 12 has a locking head 20 and a locking rod 22. As can be seen additionally in FIGS. 3 to 5 the locking head 20 has a body portion 24, three locking wings 26 and a base portion 28. The body portion 24 has an axially extending cylindrical shape and the base portion 28 extends rearwardly from the body portion 24 and has a peripheral plug surface 30 which lies on a peripheral surface of a rearwardly tapering truncated cone. The locking wings 26 are symmetrically distributed about the axis of rotation A and extend radially outwardly from the body portion 24. Each locking wing 26 has a wing surface 32 facing rearwardly, a locking wing wall 34 facing the direction of rotation R and an unlocking wing wall 36 facing a counter direction of rotation R. The wing surface 32 of each locking wing 26 lies on the truncated cone of the plug surface 30 and merges with the plug surface 30. The locking wing wall 34 and the unlocking wing wall 36 extend radially on opposing sides of the locking wing 26.

Figure 3:
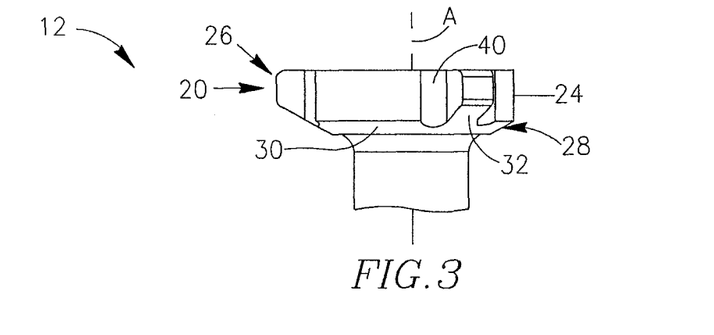
FIG. 3 is a partial side view of a locking screw.
Figure 4:
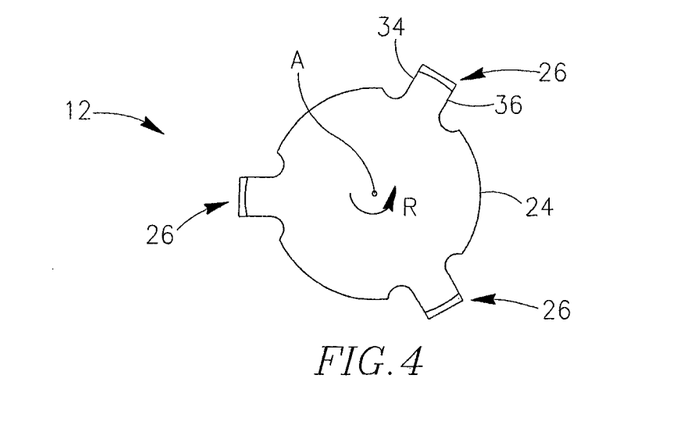
FIG. 4 is a top view of the locking screw.
Figure 5:
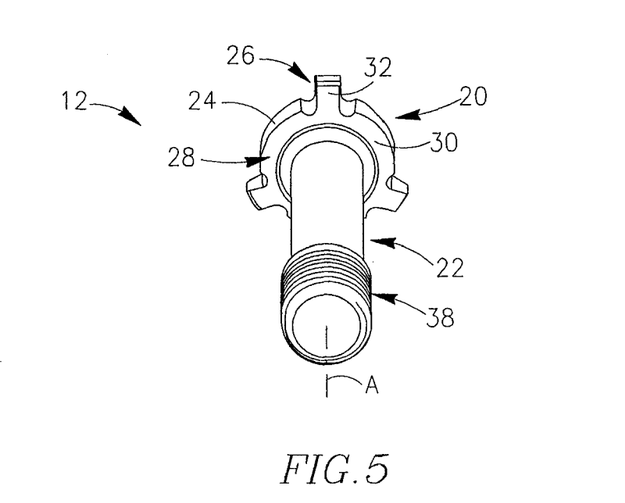
FIG. 5 is a perspective bottom view of the locking screw.

The locking rod 22 extends rearwardly from the base portion 28 and has a threaded portion 38 formed on its peripheral surface in the vicinity of its rear end. For production reasons the locking screw 12 has several rounded release surfaces 40. These release surfaces 40 are located where each locking wing 26 merges with the body portion 24.

Figure 6:
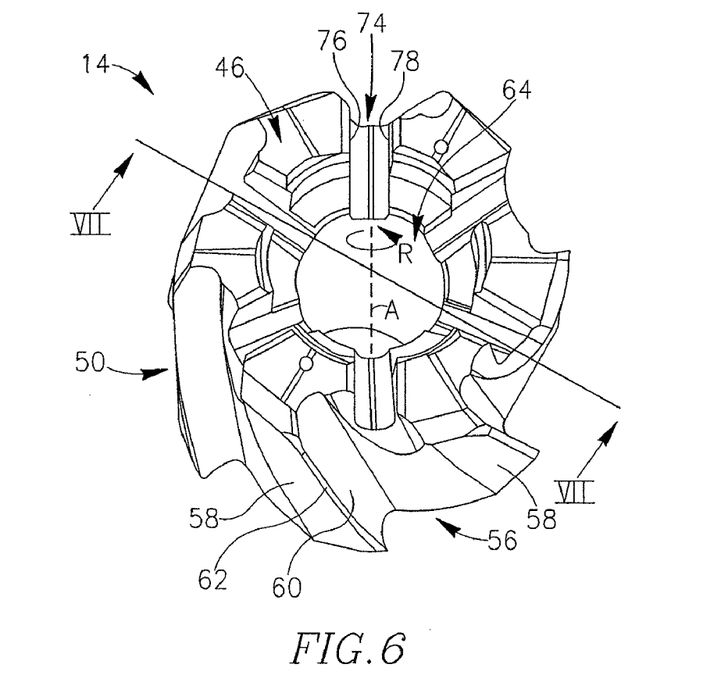
FIG. 6 is a perspective top view of a cutting head.
Figure 7:
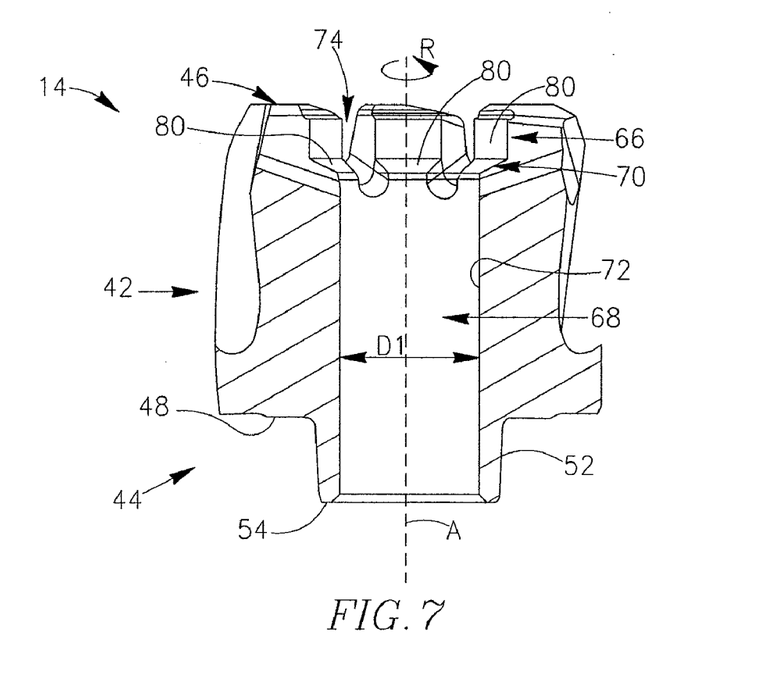
FIG. 7 is a cross sectional view of the cutting head taken along the line VII-VII in FIG. 6.

Attention is now drawn to FIGS. 6 and 7. The cutting head 14 has a head major portion 42 and a head minor portion 44. The head major portion 42 has a forwardly facing head face 46 at a forward end, a rearwardly facing head annular face 48 at a rear end and an axially extending peripheral head surface 50 therebetween. The head minor portion 44 has a peripheral head minor surface 52 which extends rearwardly from the head major portion 42 to a rearwardly facing minor face 54. The head minor surface 52 lies on a peripheral surface of a truncated cone which has a rearwardly tapering angle.

Six flutes 56 and six relief faces 58 extend rearwardly from the head face 46 to the head annular face 48 along the peripheral head surface 50. Each flute 56 is located between a given pair of adjacent relief faces 58 and has a rake face 60 facing the direction of rotation R. The intersection of each relief face 58 and its adjacent rake face 60, in the direction of rotation R, forms a cutting edge 62.

A head channel 64 extends through the cutting head 14 along the axis of rotation A. The head channel 64 has a widened portion 66, a narrowed portion 68 and a coned portion 70 therebetween. The narrowed portion 68 and the widened portion 66 have both an axially extending cylindrical shape and the coned portion 70 has an axially extending truncated coned shape which tapers rearwardly. The narrowed portion 68 opens out to the minor face 54 and has an internal peripheral first wall 72 having a first diameter D1. The widened portion 66 opens out to the head face 46 and has a diameter larger than the first diameter D1.

Six radially extending radial recesses 74, symmetrically distributed about the axis of rotation A, are formed in the cutting head 14. The radial recesses 74 are used to fasten the cutting head 14 to the shank 18 and also to provide passage for coolant fluid towards the cutting edges 62. Each radial recess 74 has a locking recess wall 76 facing the counter direction of rotation R and an unlocking recess wall 78 facing the direction of rotation R. The locking and unlocking recess walls 76, 78 extend radially and oppose each other. Each radial recess 74 communicates with the widened 66, coned 70 and narrowed 68 portions of the head channel 64, opens out to the head face 46 and opens out to the peripheral head surface 50 adjacent a given cutting edge 62. Six abutment walls 80 are formed on a peripheral surface the coned portion 70. Each abutment wall 80 is formed between a given pair of adjacent radial recesses 74.

Figure 10:
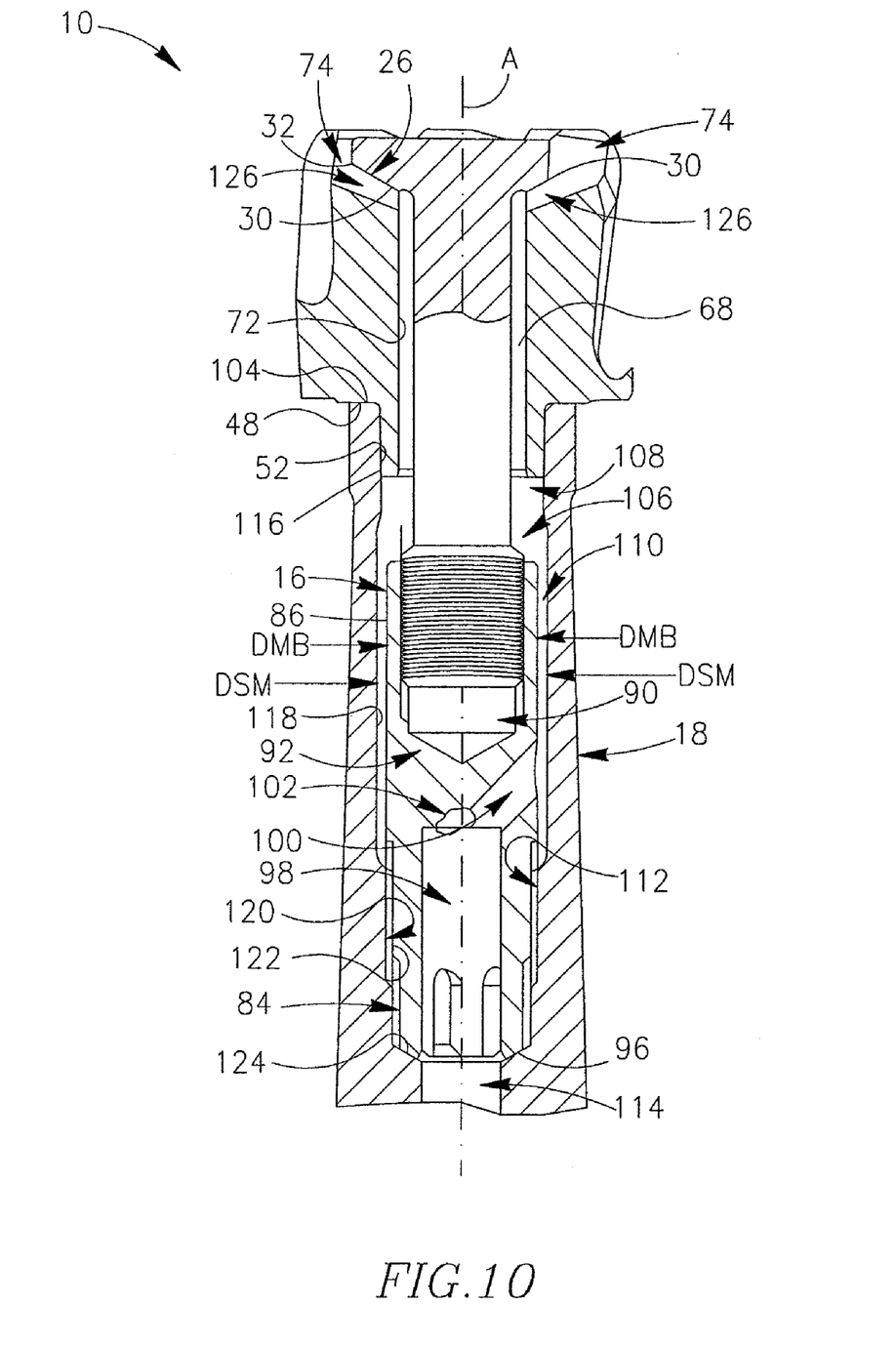
FIG. 10 is a cross sectional view of the reamer taken along the line X-X in FIG. 8.

Attention is now drawn to FIG. 10. The bushing 16 (see also FIG. 2) has a major bushing portion 82 and a finger portion 84. A peripheral bushing surface 86 of the major bushing portion 82 has an axially extending cylindrical shape having a major bushing diameter DMB. An external bushing thread 88 is formed on the bushing surface 86 adjacent a rear end thereof. A threaded bore 90 extends forwardly along the axis of rotation A from a rear ending 92 in the major bushing portion 82 and opens out to the forward end of the bushing 16. The finger portion 84 has four elongated fingers 94 symmetrically distributed about the axis of rotation A (only three can be clearly seen). Each finger 94 is circumferentially spaced apart from its adjacent two fingers 94 and extends rearwardly from the major bushing portion 82 to a finger face 96. The finger face 96 lies on a peripheral surface of a truncated cone which tapers rearwardly along the axis of rotation A. The bushing 16 has a major bushing channel 98 which communicates with three minor bushing channels 100 (only two of the minor bushing channels 100 can be seen). The major bushing channel 98 opens out to a rear end of the bushing 16 and extends forwardly along the axis of rotation A to a forward ending 102. Each minor bushing channel 100 diverges forwardly and outwardly from the forward ending 102 and opens out to the bushing surface 86. The forward ending 102 of the major bushing channel 98 is located rearwardly in relation to the rear ending 92 of the threaded bore 90.

The shank 18 has a forwardly facing shank annular face 104 at a forward end thereof and a shank channel 106 extending along the axis of rotation A. The shank channel 106 opens out to the shank annular face 104 and has a neck portion 108, a main portion 110, a sub-main portion 112 and a root portion 114. An internal peripheral neck surface 116 of the neck portion 108 lies on a peripheral surface of a truncated cone which has a rearwardly tapering angle which is slightly smaller than the rearwardly tapering angle of the head minor surface 52. The main portion 110 has an internal peripheral main wall 118 having an axially extending cylindrical shape. The main wall 118 has a shank main diameter DSM which is larger than the major bushing diameter DMB. The sub-main portion 112 extends rearwardly from the main portion 110 and has an internal peripheral sub-main wall 120. The sub-main wall 120 has an axially extending cylindrical surface having a diameter similar to the major bushing diameter DMB. An internal shank thread 122 is formed on the cylindrical surface of the sub-main portion 112. A stop surface 124 is formed on the sub-main wall 120 at a rear end thereof. The stop surface 124 lies on a peripheral surface of a truncated cone which tapers rearwardly. The root potion 114 of the shank channel 106 extends rearwardly from the sub-main portion 112 of the shank channel 106.

The assembly of the reamer 10 is performed by placing the bushing 16 with its finger portion leading 84 within the shank channel 106 and bringing the bushing thread 88 into initial threading engagement with the shank thread 122. The bushing 16 is then screwed further into the shank thread 122 until the bushing's finger faces 96 abut the stop surface 124 of the shank channel 106 and slightly slide radially inwardly thereupon. The fingers 94 of the bushing 16, which are now slightly bent, press against the stop surface 124 of the shank channel 106 and give rise to a frictional force which is formed therebetween. This frictional force works against forces acting to unscrew the bushing 16 out of the shank thread 122 such as when replacing the cutting head 14 of the reamer 10 (as will be described below). In general, the assembly process of the bushing 16, described above, need only be performed once. In this position, the major bushing channel 98 communicates with the root portion 114 of the shank channel 106 and the minor bushing channels 100 communicate with the main portion 110 of the shank channel 106.

Figure 8:
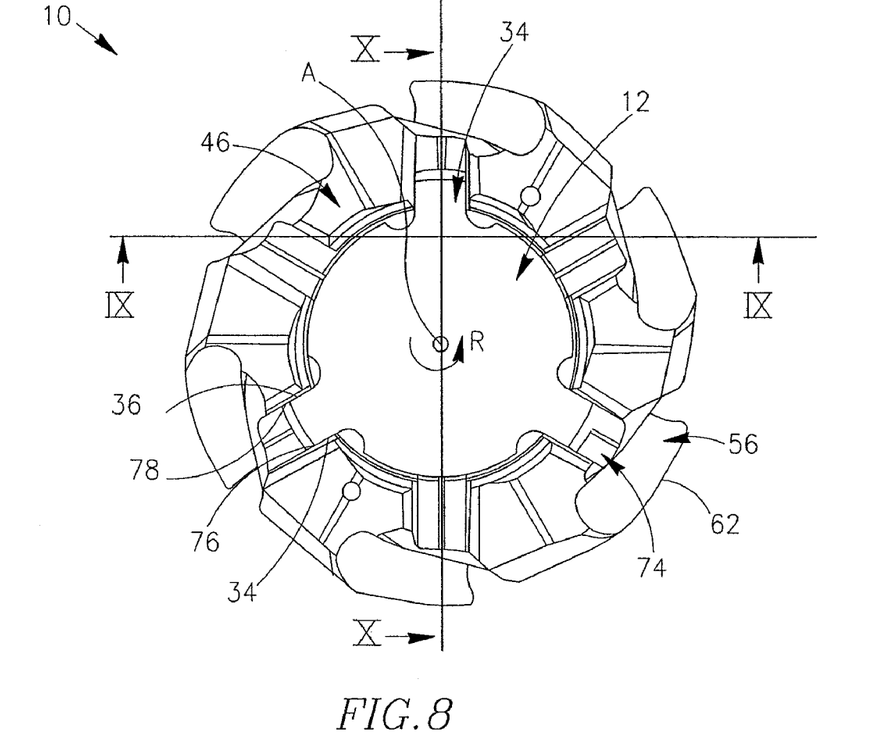
FIG. 8 is a top view of the reamer.

Mounting of the cutting head 14 on the shank 18 is performed by placing the cutting head 14 at the forward end of the shank 18 with its head minor portion 42 protruding into the neck portion 108 of the shank channel 106. In this position the locking screw 12 is inserted, with its threaded portion 38 leading, through the head channel 64 into the shank channel 106 until its threaded portion 38 is brought into threading engagement with the threaded bore 90 of the bushing 16. The cutting head 14 is then lifted forwardly by hand until three of its radial recesses 74 are occupied by the three locking wings 26 of the locking screw 12 while the remaining three radial recesses 74 of the cutting head 14 are free (See FIG. 8). The cutting head 14 is then held together with the locking head 20 and rotated in the counter direction of rotation R by hand until the cutting head 14 is adjacent the shank 18 and the locking wings 26 can not be removed from the radial recesses 74 which they occupy.

Figure 9:
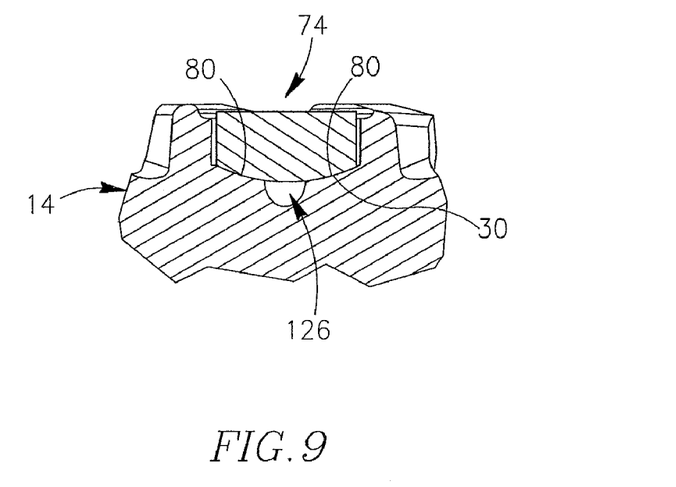
FIG. 9 is a partial cross sectional view of the reamer taken along the line IX-IX in FIG. 8.

A key (not shown) having protrusions, that match the three radial recesses 74 of the cutting head 14 which are free, is used to secure the cutting head 14 to the shank 18. Using the key, the cutting head 14 is rotated in the counter direction of rotation R about the axis of rotation A. The locking recess walls 76, of the three radial recesses 74 which are occupied, engage the locking wing walls 34 of the locking screw 12 and thereby urge the locking screw 12 to rotate in the counter direction of rotation R. The locking screw 12 is screwed further into the bushing 16 until the plug surface 30 of the locking head 20 abuts the abutment walls 80 of the cutting head 14 (See FIG. 9) urging the cutting head 14 axially rearwardly towards the shank 18. The head minor portion 44 of the cutting head 14 then resiliently deforms a portion of the shank 18 surrounding the neck portion 108 of the shank channel 106 until the head minor surface 52 and the neck surface 116 abut and the shank annular face 104 and the head annular face 48 abut. In this position the cutting head 14 is fully secured in the reamer 10 and the locking head 20 is fully located in the head channel 64 so that there is no portion of the locking screw 12 that, projects forwardly beyond the head face 46 of the cutting head 14 and, may interfere in a cutting operation. In the now assembled reamer 10, six passages 126 (see FIGS. 9 and 10) are formed between the plug surface 30 of the locking screw 12 and the six radial recesses 74. Each passage 126 communicates with the narrowed portion 68 of the head channel 64 and extends radially outwardly until it ends within its associated radial recess 74. Three passages 126 (e.g. left passage 126 in FIG. 9), associated with the three radial recesses 74 occupied by locking wings 26, extend radially outwardly alongside the plug surface 30 and the wing surface 32. The remaining three passages 126 (e.g. right passage 126 in FIG. 9) extend radially outwardly a shorter distance only alongside the plug surface 30.

To release the cutting head 14 from the reamer 10 the cutting head 14 is rotated using the key about the axis of rotation A in the direction of rotation R. The unlocking recess walls 78 of the occupied radial recesses 74 bear against the unlocking wing walls 36 of the locking screw 12 and urge the locking screw 12 to rotate in the direction of rotation R. The locking screw 12 is screwed out of the threaded bore 90 of the bushing 16 while the bushing 16 is kept in place by the frictional force which exists between the finger faces 96 of the finger portion 84 and the stop surface 124 of the shank channel 106.

The flow of coolant fluid through the assembled reamer 10 during a cutting operation is as following. Coolant fluid enters the major bushing channel 98 of the bushing 16 from the root portion 114 of the shank channel 106. It then flows forwardly and outwardly through the three minor bushing channels 100 of the bushing 16 into a space formed between the bushing surface 86 of the bushing 16 and the main wall 118 of the shank channel 106. From there the coolant fluid flows forwardly through the neck portion 108 of the shank channel 106 and into the narrowed portion 68 of the head channel 64 until it bears against the plug surface 30 of the locking screw 12 and is directed radially outwardly into the radial recesses 74 along the passages 126. The six streams of coolant fluid, flowing radially outwardly through the six passages 126, reach the six flutes 56 of the cutting head 14 and their associated cutting edges 62. It is noted that the coolant fluid, in addition to being directed radially outwardly by the plug surface 30 (as described above), is also urged radially outwardly due to centrifugal forces acting on the reamer 10 during a reaming operation.

The present invention potentially provides a number of advantages. Forces acting on the cutting head in a counter direction of rotation can be transferred to each locking wing via its associated radial recess and thereby fasten the locking screw and axially secure the cutting head to the shank. The bushing may enable releasable retention of the locking screw in the shank channel while directing the flow of coolant fluid along a periphery, and not through, the locking screw thereby maintaining the full solid structure and strength of the locking screw. The locking screw, by virtue of its full solid and therefore strong structure, may be used in small diameter cutting tools with limited room in which internal cooling is required. Coolant fluid flows towards the cutting edges through the passages instead of through the locking wings in order to maintain the full solid strong structure of the locking wings which lock the cutting head to the shank.

Although the present invention has been described to a certain degree of particularity, it should be understood that various alterations and modifications could be made without departing from the scope of the invention as hereinafter claimed.

What is claimed is:

1. A rotary cutting tool having a longitudinal axis of rotation, the rotary cutting tool comprising:
   a shank having an axially extending shank channel;
   a cutting head mounted at a forward end of the shank, the cutting head comprising:
      an axially extending head channel;
      a head face formed at a forward end of the cutting head;
      a peripheral head surface;
      at least one radial recess formed in the head face, the radial recess communicating with the head channel and opening out to the peripheral head surface; and
   a locking screw retained in the shank channel and securing the cutting head to the shank, the locking screw comprising at least one locking wing extending in a direction transverse to the longitudinal axis of rotation, wherein the at least one locking wing is located in an associated radial recess.

2. A rotary cutting tool having a longitudinal axis of rotation, the rotary cutting tool comprising:
   a shank having an axially extending shank channel;
   a cutting head mounted at a forward end of the shank, the cutting head comprising:
      an axially extending head channel;
      a head face formed at a forward end of the cutting head; and
      at least one radial recess formed in the head face; and
   a locking screw retained in the shank channel and securing the cutting head to the shank, the locking screw comprising at least one locking wing extending in a direction transverse to the longitudinal axis of rotation, wherein the at least one locking wing is located in an associated radial recess;
   wherein at least one passage suitable for delivery of a coolant is formed between the locking screw and the cutting head.

3. The rotary cutting tool according to claim 2, wherein the at least one passage extends radially.

4. The rotary cutting tool according to claim 2, wherein the at least one passage is formed at the at least one radial recess.

5. A rotary cutting tool having a longitudinal axis of rotation, the rotary cutting tool comprising:
   a shank having an axially extending shank channel;
   a cutting head mounted at a forward end of the shank, the cutting head comprising:
      an axially extending head channel;
      a head face formed at a forward end of the cutting head; and at least one radial recess formed in the head face; and a locking screw retained in the shank channel and securing the cutting head to the shank, the locking screw comprising at least one locking wing extending in a direction transverse to the longitudinal axis of rotation, wherein the at least one locking wing is located in an associated radial recess; wherein:

the cutting head comprises a plurality of cutting edges on a peripheral head surface thereof; and the at least one radial recess communicates with the head channel and opens out to the peripheral head surface adjacent a given cutting edge.

6. The rotary cutting tool according to claim 2, wherein the locking screw is retained in the shank channel by a threaded bushing positioned in the shank channel.

7. The rotary cutting tool according to claim 6, wherein:

the locking screw comprises an axially extending locking rod having a threaded portion;

at least a portion of the shank channel comprises an internal shank thread;

the threaded bushing is threadingly engaged in the internal shank thread; and the locking rod is threadingly engaged in the threaded bushing.

8. The rotary cutting tool according to claim 7, wherein the threaded bushing has:

a major bushing channel opening out to a rear end thereof; and at least one minor bushing channel diverging forwardly and opening out to a peripheral bushing surface thereof.

9. The rotary cutting tool according to claim 2, wherein the rotary cutting tool is a reamer.

10. A rotary cutting tool having a longitudinal axis of rotation, the rotary cutting tool comprising:

a shank having an axially extending shank channel;

a cutting head mounted at a forward end of the shank, the cutting head comprising:

an axially extending head channel;

a head face formed at a forward end of the cutting head;

a peripheral head surface;

at least one radial recess formed in the head face, the radial recess communicating with the head channel and opening out to the peripheral head surface; and a locking screw extending axially through the head channel and being retained in the shank channel;

wherein at least one passage suitable for delivery of a coolant is formed between the locking screw and the cutting head.

11. A rotary cutting tool having a longitudinal axis of rotation, the rotary cutting tool comprising:

a shank having an axially extending shank channel;

a cutting head mounted at a forward end of the shank, the cutting head comprising:

an axially extending head channel; and a locking screw extending axially through the head channel and being retained in the shank channel;

wherein:

at least one passage suitable for delivery of a coolant is formed between the locking screw and the cutting head; and the cutting head comprises a head face and at least one radial recess, the at least one radial recess is formed in the cutting head and opens out to the head face and the at least one passage is formed between the locking screw and the at least one radial recess.

12. The rotary cutting tool according to claim 11, wherein the at least one passage extends radially.

13. The rotary cutting tool according to claim 11, wherein the cutting head comprises a plurality of cutting edges on a peripheral head surface thereof, the at least one radial recess communicates with the head channel and opens out to the peripheral head surface adjacent a given cutting edge.

14. The rotary cutting tool according to claim 11, wherein the locking screw is retained in the shank channel by a threaded bushing positioned in the shank channel.

15. A rotary cutting tool having a longitudinal axis of rotation, the rotary cutting tool comprising:

a shank having an axially extending shank channel;

a cutting head mounted at a forward end of the shank, the cutting head comprising:

an axially extending head channel; and a locking screw extending axially through the head channel and being retained in the shank channel;

wherein:

at least one passage suitable for delivery of a coolant is formed between the locking screw and the cutting head;

the locking screw is retained in the shank channel by a threaded bushing positioned in the shank channel;

the locking screw comprises an axially extending locking rod having a threaded portion;

at least a portion of the shank channel comprises an internal shank thread;

the threaded bushing is threadingly engaged in the internal shank thread; and the locking rod is threadingly engaged in the threaded bushing.

16. The rotary cutting tool according to claim 15, wherein the threaded bushing has:

a major bushing channel opening out to a rear end thereof; and at least one minor bushing channel diverging forwardly and opening out to a peripheral bushing surface thereof.

17. The rotary cutting tool according to claim 11, wherein the rotary cutting tool is a reamer.

* * * * *